2 Sheets—Sheet 1.

G. F. EVANS,

Assignor, by mesne assignments, to R. H. & E. MITCHELL, ass'rs to H. WATERMAN.

Bench-Planes.

No. 7,918. Reissued Oct. 23, 1877.

Richard H. Mitchell & Edwin Mitchell
Assignees of
George F. Evans.
Inventor.

Attest:
H. L. Perrine
A. M. Connell

By. James M. Blanchard
Attorney.

N. PETERS, PHOTO-LITHOGRAPHER, WASHINGTON, D. C.

G. F. EVANS,

Assignor, by mesne assignments, to R. H. & E. MITCHELL, ass'rs to H. WATERMAN.

Bench-Planes.

No. 7,918. Reissued Oct. 23, 1877.

Richard L. Mitchell & Edwin Mitchell
Assignees of
George F. Evans.
Inventor.

Attest:
H. L. Perrine.
C. M. Connell

By. James M. Blanchard
Attorney.

N. PETERS, PHOTO-LITHOGRAPHER, WASHINGTON, D. C.

UNITED STATES PATENT OFFICE.

RICHARD H. MITCHELL AND EDWIN MITCHELL, OF HUDSON, NEW YORK, ASSIGNEES, BY MESNE ASSIGNMENTS, OF GEORGE F. EVANS, ASSIGNORS TO HENRY WATERMAN, OF SAME PLACE.

IMPROVEMENT IN BENCH-PLANES.

Specification forming part of Letters Patent No. 41,983, dated March 22, 1864; Reissue No. 7,918, dated October 23, 1877; application filed September 28, 1877.

*To all whom it may concern:*

Be it known that GEORGE F. EVANS, of Norway, in the county of Oxford and State of Maine, has invented certain new and useful Improvements in Bench-Planes; and we do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1:
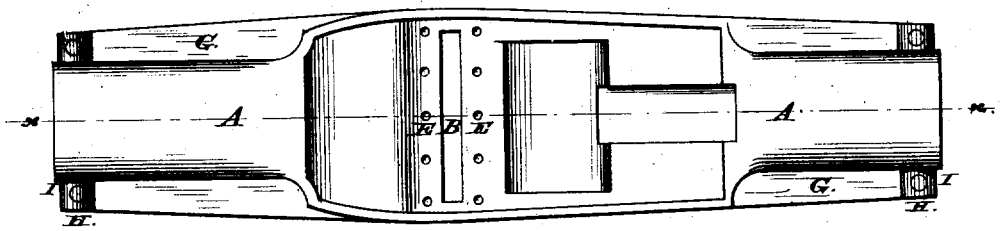
Figure 2:
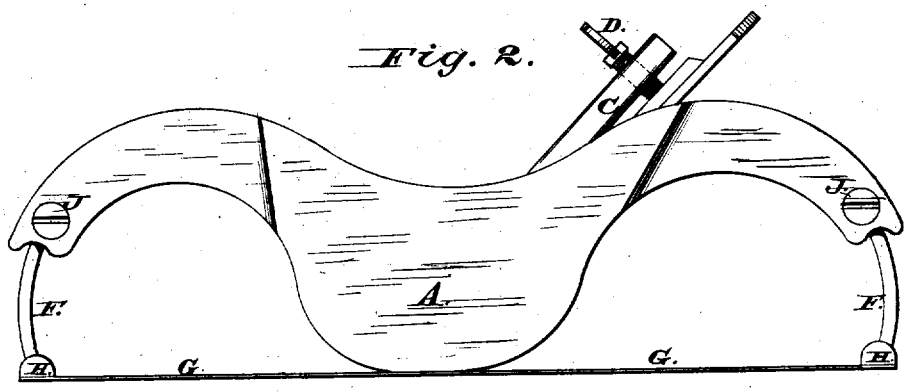
Figure 3:
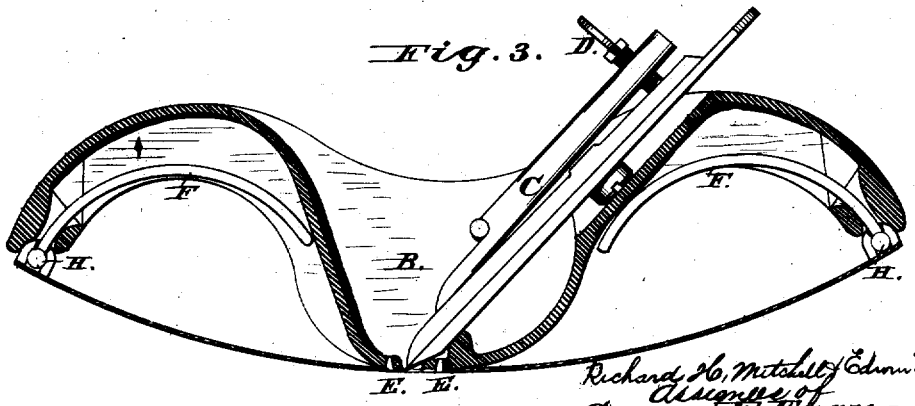
Figure 4:
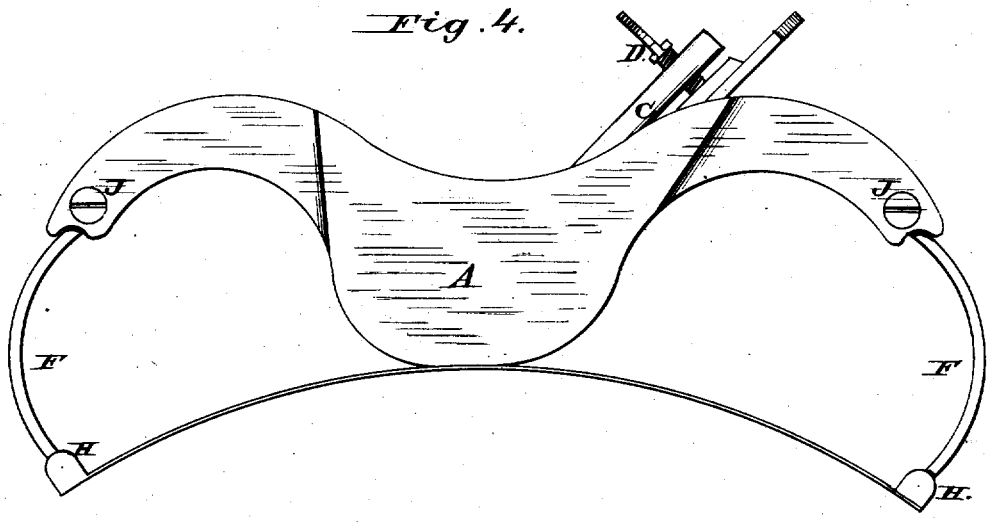
Figure 5:
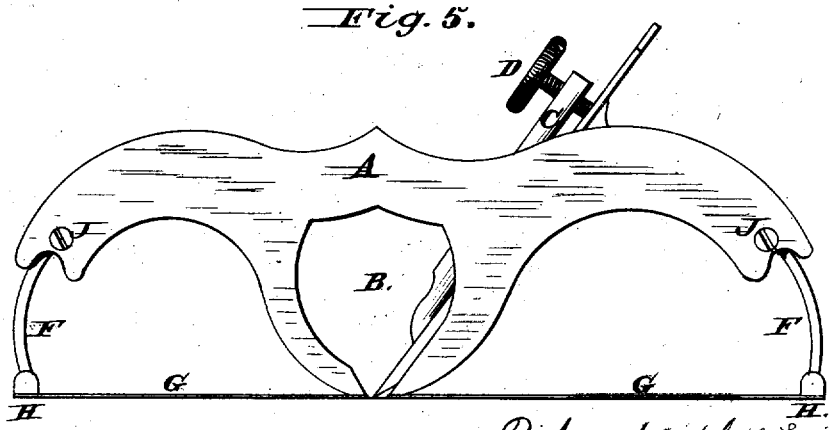

Figure 1 is a plan. Fig. 2 is a longitudinal elevation with the face-plate in a straight position. Fig. 3 is a longitudinal vertical section with the face-plate in a convex position. Fig. 4 is a longitudinal elevation with the face-plate in a concave position, or reversed from that in Fig. 3. Fig. 5 is a longitudinal elevation of the rabbet and grooving plane with the face-plate in a straight position.

The nature of this improvement consists not only in the manner of making the stock, but in the combination of the arms which connect the ends of the spring face-plate to the stock, the same admitting the spring face-plate to be curved either convexly or concavely on its outer surface.

These planes are so constructed that they may be more readily adjusted to conform to concave and convex surfaces of different degrees of curvature, whereby such circular parts may be as easily and smoothly planed, grooved, or rabbeted as a plane surface can be by the ordinary straight-faced plane.

In the drawings, A is the stock or body of the plane, the same having a throat or shavings-passage, B, formed vertically through it, (horizontally in the grooving-plane, Fig. 5.) In the said passage is the plane-iron, which is secured by the lever-clip C and the thumb-screw D.

Instead of forming the stock A with its lower face rigidly straight, I fasten thereto a flat steel plate, using for fastenings steel rivets, which pass through said stock in front and in rear of its throat, and through the plate, and thus unite the parts at that point.

Within the two ends of the stock A pass the connecting-rods F F, the lower end of each rod having a hinge-joint, consisting of a socket or hollow pipe with solid ends, which is fastened to the ends of the steel plate G G by means of two rivets, I I. In each end of the stock A is a set-screw, H, which holds the connecting-rods F F in position, as shown in Figs. 2 and 4.

A plane constructed in the above-described improved manner can be readily adjusted to plane any circular, concave, or convex piece of wood, also to groove or rabbet the same, by simply bending the plate G to the desired position and securing it by means of the connecting-rods F F and the set-screws J J.

From the above, and by inspection of the drawings, it will be perceived that my improved plane has its stock formed with two curved ends or projections, the upper surfaces of which are rounded, and which extend from the part B, one of which is adapted to hold the plane-iron, and both to receive the curved arms F F, so as to allow said arms to play or move in curved paths both toward and away from the said part B. Now, this mode of making the plane-stock not only enables the spring face-plate to be bent either into a concave or convex form, but it renders the curved ends or projections very convenient as handles by which the plane may be held and operated. Furthermore, they not only give to the connections F F a long range of motion, but keep their upper ends always within the stock when the face-plate is convex on its outer surface, there being no projection of the connections F F above the top surface of the plane-stock when the plate G is bent to its extreme position, as shown in Fig. 3.

Having thus described the invention, what we claim, and desire to secure by Letters Patent, is—

1. A stock for a flexible or spring faced plane, having its outer ends curved, substantially as described, whereby they are made to form chambers for the reception of connecting-rods, which hold the outer ends of the flexible or spring face of the plane in position, as described.

2. A stock for a flexible or spring faced plane the outer ends of which are curved, substantially as shown, the upper surfaces of such curved portions being rounded, as described, whereby said curved portions are made to serve as handles for moving and guiding the plane, as set forth.

3. A stock for a flexible or spring faced plane, having apertures in its lower surface for the passage of the curved connecting-rods which are attached to the flexible or spring face, substantially as shown and described.

4. The combination of the connecting-rods F F, spring-plate G G, and curved chambers in the stock of the plane, substantially as shown and described.

In testimony that we claim the foregoing we have hereunto set our hands this 24th day of September, 1877.

GEORGE F. EVANS,
Per RICHD. H. MITCHELL,
EDWIN MITCHELL,
*Assignees.*

Witnesses:
WM. SEYMOUR,
G. C. MCARTHUR.